July 7, 1942.  A. BARNSTEINER ET AL  2,289,170

DEEP WELL COOKER

Filed Dec. 11, 1940

WITNESSES:
E.A. M'Closkey
H.G. Hepler

INVENTORS
Alfons Barnsteiner and
Edwin H. Lockwood.
BY
W. R. Coley
ATTORNEY

Patented July 7, 1942

2,289,170

UNITED STATES PATENT OFFICE 2,289,170

DEEP WELL COOKER

Alfons Barnsteiner and Edwin H. Lockwood, Mansfield, Ohio, assignors to Westinghouse Electric & Manufacturing Company, East Pittsburgh, Pa., a corporation of Pennsylvania Application December 11, 1940, Serial No. 369,554

3 Claims. (Cl. 219—35)

This invention relates to domestic appliances and more particularly to electric deep well cookers for electric ranges and the like.

It is an object of our invention to provide an efficient, relatively short, deep well-type of electric cooker which may be interchangeably positioned in the openings of various electric range platforms.

It is a further object of our invention to provide a relatively short, interchangeable, deep well-type of electric cooker having a vessel which has substantially the same capacity as cookers used heretofore and which will fit within a heater opening in the working surface of a range and preferably above an oven.

It is another object of our invention to provide an efficient, inexpensive, deep well-type of electric cooker which may be readily attached to many of the present well known range structures, and which, while having substantially the same capacity and diameter as the present well known cookers, has an overall height less than such cookers.

It is a still further object of our invention to provide a deep-well electric cooker which has a heating element located within the confines thereof and which has its terminals extending therefrom horizontally outward therefrom substantially in the plane thereof.

Other objects of our invention will either be pointed out specifically in the course of the following description of a device embodying our invention or will be apparent from such description.

Figure 1:
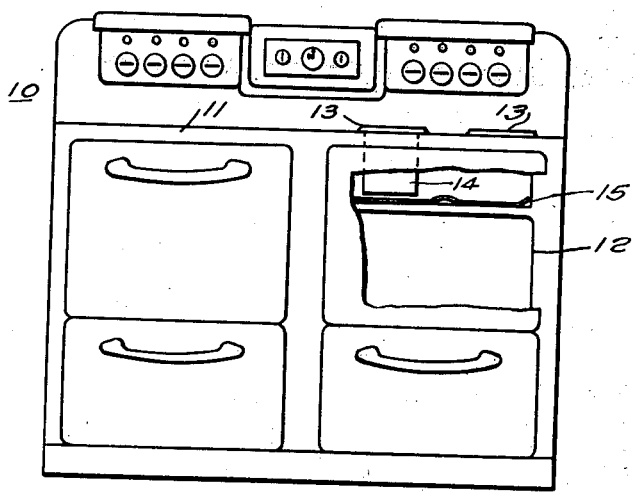
Figure 1 is a front elevational view of a range structure with a portion thereof broken away to illustrate the relative position of the deep well cooker embodying our invention and the various parts of the range structure proper.
Figure 2:
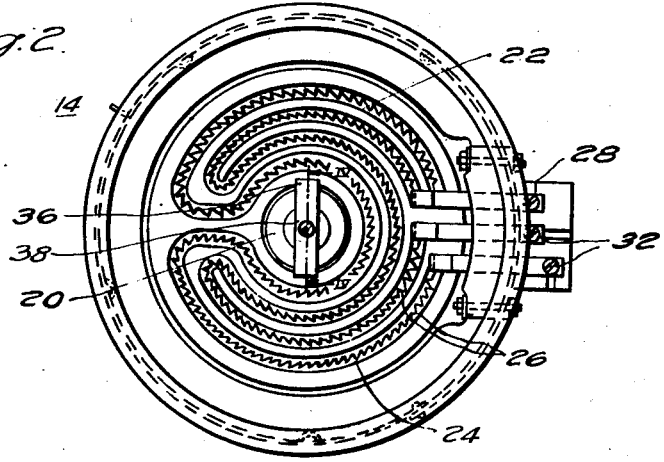
Fig. 2 is a top view of the deep well cooker embodying our invention, the lid and inner well being removed to show the heating element at the bottom.
Figure 3:
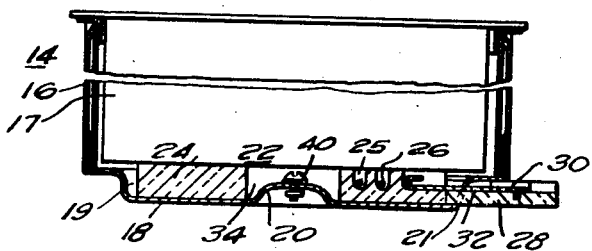
Fig. 3 is a partial elevational and sectional view of the device shown in Fig. 2.

Referring to the accompanying drawing, in which like reference characters indicate like parts in the several figures, there is shown an electric range 10 having a working platform 11, an oven 12, positioned beneath such platform, surface heating elements 13 positioned upon the platform and above the oven 12, and a relatively short, interchangeable, deep well-type cooker or cooking vessel 14 which is supported by the platform 11 above the oven 12.

The range structure 10 embodying the working platform 11 and oven 12 is constructed in a well-known manner. A plurality of the usual openings, not shown, are located within the platform above the oven 12 for receiving the heating elements 13 and cooker 14. A suitable crumb tray 15 is positioned above the oven 12 and beneath the heating elements 13 to receive any extraneous matter or spillage which may pass beneath the heating elements. It is to be understood that the range structure proper illustrated in Fig. 1 is purely illustrative and forms no part of the present invention.

The cooker 14 embodies, in this instance, a substantially cylindrical, upstanding side wall structure 16 preferably constructed in accordance with the teachings of A. Barnsteiner application Serial No. 311,632, filed December 29, 1939, and assigned to the assignee of this application. An inner well-shaped vessel or pot 17 is positioned within the cooker in accordance with general practice. A substantially horizontally extending bottom 18 is attached to the side wall structure 16 and has an upwardly extending boss 20 preferably at the mid point thereof. The bottom 18 is, in this instance, somewhat depressed so as to form a shallow dish-like opening 19 for receiving the heating element 22. An opening 21 is positioned within one side of the depressed portion of the bottom 18 for permitting a terminal member 28 to pass therethrough, as hereinafter described.

The heating element 22 comprises, in this instance, a substantially annularly-shaped preferably porcelain base 24 having a plurality of elongated grooves 25 positioned within the upper surface thereof. An electrical resistance member or heating element 26 is suitably positioned within the grooves 25 in the top surface of the base 24. The grooves 25 and the electrical resistance 26 are positioned upon the top surface of the base 24 in substantially an open spiral pattern with the terminals of the heating element located at one point. The position of the terminals of the heating element 22 is substantially in line with the opening 21 in the bottom 18 of the cooker structure 14 so as to permit ready connection of the terminal member 28 to the electrical resistance 26.

The terminal member 28 comprises, in this instance, a substantially flat elongated member which is adapted to extend outwardly from the heating element 22 through the opening 21 in the depressed portion 18 of bottom 19. This terminal member is preferably formed of an insulating material such as, for example, porcelain. A plurality of horizontally extending slots or openings 30 are, in this instance, positioned within the upper surface of the terminal member 28 for receiving electrical terminal straps 32 whereby the electrical resistance 26 may be connected to a suitable power supply, not shown, in a well known manner.

Figure 4:
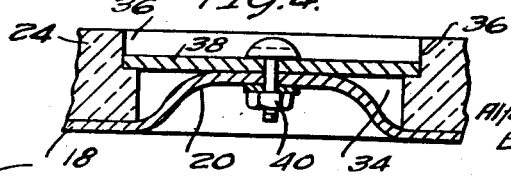
Fig. 4 is a partial sectional view taken along the line IV—IV of Fig. 2 and drawn to an enlarged scale.

A centrally located, substantially cylindrical aperture 34 is positioned within the porcelain base 24 of heating element 22 for receiving the upwardly extending boss 20 when the heating element 22 is located in its operative position upon the bottom 18. At least two notches 36 are positioned within the porcelain base 24 of heating element 22, adjacent the opening therein and diametrically opposite to each other, within the upper surface of such base. These notches 36 are adapted to receive an elongated metallic attaching bar 38. It will be noted, by referring to Fig. 4, that the attaching bar 38, when positioned within the notches 36, rests upon the upper surface of the boss 20. A suitable bolt and nut structure 40 is then passed through the central portion of the attaching bar 38 and the boss 20 for rigidly attaching the attaching bar 38 to the bottom 18.

It is, therefore, evident that the attaching bar 38, when positioned within the notches 36 of base 24 of the heating element 22, provides means wholly within the exterior confines of the cooker jacket, comprising the upstanding walls and bottom 18, and cooperating with the boss in the bottom 18 (by means of bolt and nut structure 40) for attaching the heating element 22 to such deep well cooking jacket.

By having the heating element 22 positioned within the bottom plate 18 of the deep well-type cooker 14 and by having the terminal structure 28 therefor positioned at the side thereof, it follows that the vertical distance required for receiving the deep well-type of cooker 14, embodying our invention, is considerably less than those types of cookers in which the terminal structure 28 is positioned beneath the bottom thereof. In addition, by having means such as boss 20 and attaching bar 38 disposed wholly within the confines of the cooker, the over-all height of the cooker is materially reduced over those cookers having the attaching means exposed outside the confines of such cooker.

By having a cooker structure built in accordance with our invention, having approximately the same diameter as certain standard surface heating elements, it follows that such cooker may be interchangeably positioned within the openings normally adapted to receive such surface heating elements. Such cooker, by being relatively shorter than the usual cooker, occupies less vertical space which thus permits the cooker to be satisfactorily positioned over most ovens heretofore used. In addition, by being relatively shorter than most cookers, a larger oven than heretofore used may be used thereunder, or the usual sized oven may have more insulation placed thereabouts. Further, by having the terminal member 28 extending outwardly from the cooker, electrical conductors attached thereto are in no danger of being shorted by the crumb tray 15 placed over the oven.

It, therefore, follows that we have thus provided a deep well-type cooker having substantially the same capacity as those heretofore used while having the same diameter which permits such cooker to be interchangeably used on many range structures at the same time, being shorter, such cooker may be positioned over standard range ovens, where heretofore cookers could not be used.

While this invention is shown in but one form, it will be obvious to those skilled in the art that it is not so limited but is susceptible to various changes and modifications without departing from the spirit and scope thereof, and it is desired, therefore, that only such limitations shall be placed thereupon as are specifically set forth in the appended claims.

We claim as our invention:

1. An electric cooking device comprising a cup-shaped shell, a heating element located within the shell having an aperture at substantially the midpoint thereof, diametrically opposed notches positioned adjacent said aperture, and means cooperating with the notches in the heating element for fastening the heating element to the shell.

2. An electric cooking device comprising a cup-shaped shell including a base portion, an upwardly extending boss formed within said base, a heating element located within the shell having an aperture at substantially the midpoint thereof, diametrically opposed notches positioned adjacent said aperture, and means cooperating with the notches in the heating element and boss for fastening the heating element to the shell.

3. In a cooking device having an exterior shell including side walls and a bottom, the combination of a heating element normally positioned upon the bottom of the exterior shell, said heating element embodying an annularly-shaped insulating member having diametrically positioned notches in its inner edge, an electrical resistance member, and a horizontally extending terminal member positioned in substantially the same plane as the insulating member and extending outside the shell for receiving electrical conductors, a fastening member positioned within the hollow central portion of the insulating member and within the notches and means engaging the fastening member and bottom of the shell for retaining the heating element in position.

ALFONS BARNSTEINER.
EDWIN H. LOCKWOOD.